(12) United States Patent
Kress et al.

(10) Patent No.: US 7,530,769 B2
(45) Date of Patent: May 12, 2009

(54) TOOL FOR THE METAL CUTTING MACHINING OF VALVE SEATS

(75) Inventors: Dieter Kress, Aalen (DE); Friedrich Häberle, Lauchheim (DE)

(73) Assignee: Mapal Fabrik fur, Prazisionswerkzeuge Dr. Kress AG (DE)

( * ) Notice: Subject to any disclaimer, the term of this patent is extended or adjusted under 35 U.S.C. 154(b) by 299 days.

(21) Appl. No.: 10/601,818

(22) Filed: Jun. 23, 2003

(65) Prior Publication Data

US 2004/0009046 A1 Jan. 15, 2004

(30) Foreign Application Priority Data

Jun. 21, 2002 (DE) ................................ 102 28 503

(51) Int. Cl.
*B23B 35/00* (2006.01)
(52) U.S. Cl. .................. 408/1 R; 407/11; 407/107; 408/83.5; 408/187; 408/199
(58) Field of Classification Search ................. 407/1 R, 407/11, 103, 104, 107, 113; 408/83.5, 187, 408/188, 713, 1 R, 199, 227, 223, 224; *B23B 41/12*
See application file for complete search history.

(56) References Cited

U.S. PATENT DOCUMENTS

| | | | | |
|---|---|---|---|---|
| 3,271,842 A | * | 9/1966 | Breuning | 407/114 |
| 3,816,018 A | * | 6/1974 | Hlocky | 408/59 |
| 4,035,890 A | * | 7/1977 | Eriksson et al. | 407/104 |
| 4,066,376 A | * | 1/1978 | Eckle et al. | 407/101 |
| 4,202,650 A | * | 5/1980 | Erickson | 407/46 |
| 4,535,216 A | | 8/1985 | Cassidenti | 219/68 |
| 4,580,930 A | * | 4/1986 | Zinner | 407/110 |
| 4,636,116 A | * | 1/1987 | Shikata | 407/103 |
| 4,722,642 A | | 2/1988 | Musacchia, Jr. | 407/85 |
| 4,848,198 A | * | 7/1989 | Royal et al. | 82/1.11 |
| 4,938,639 A | * | 7/1990 | Lockard | 407/103 |
| 4,966,500 A | | 10/1990 | Tsujimura et al. | 407/34 |
| 4,971,483 A | * | 11/1990 | Kress et al. | 407/114 |
| 5,033,916 A | * | 7/1991 | Dunklau | 407/33 |
| 5,100,269 A | * | 3/1992 | Lyon et al. | 407/107 |
| 5,150,992 A | * | 9/1992 | Friedmann | 407/110 |
| 5,342,151 A | * | 8/1994 | Friedmann | 407/116 |
| 5,360,298 A | * | 11/1994 | Hedlund | 407/110 |
| 5,494,383 A | * | 2/1996 | Kress et al. | 408/231 |
| D377,801 S | * | 2/1997 | Kress et al. | D15/139 |
| 5,685,769 A | | 11/1997 | Adia et al. | 451/540 |
| 5,704,741 A | | 1/1998 | Cirino | |
| 5,718,156 A | * | 2/1998 | Lagrolet et al. | 82/1.11 |

(Continued)

FOREIGN PATENT DOCUMENTS

DE 37 40 814 A1 6/1989

(Continued)

*Primary Examiner*—Daniel W Howell

(57) ABSTRACT

A tool for metal-cutting machining of a surface of an opening particularly of a valve seat in a cylinder head of an internal combustion engines. The tool has a cutter tip with at least one geometrically defined cutting edge. The cutter tip rests on two supporting regions in the tool which are arranged at an angle α, and an angle-bisecting line runs essentially perpendicularly with respect to the active cutting edge which then is removing chips from the valve seat. A claw holds the cutting tip to the tool end. Coolant and lubricant are supplied through an outlet from the claw.

19 Claims, 6 Drawing Sheets

U.S. PATENT DOCUMENTS

| | | | | |
|---|---|---|---|---|
| 5,746,549 A * | 5/1998 | Kress et al. | ................ | 407/102 |
| 5,820,310 A * | 10/1998 | Boianjiu | ................ | 407/66 |
| 5,829,924 A * | 11/1998 | Oshnock et al. | ............ | 407/110 |
| 5,836,723 A * | 11/1998 | Von Haas et al. | .......... | 407/107 |
| 5,836,724 A * | 11/1998 | Satran et al. | ................ | 407/104 |
| 5,876,155 A * | 3/1999 | Link et al. | ................. | 408/1 R |
| 5,915,889 A * | 6/1999 | Kress et al. | ................ | 407/114 |
| 6,004,081 A * | 12/1999 | Hellstrom et al. | .......... | 407/103 |
| 6,050,751 A * | 4/2000 | Hellstrom | ................ | 407/104 |
| 6,079,912 A | 6/2000 | Rothballer | ................ | 407/114 |
| 6,146,060 A * | 11/2000 | Rydberg et al. | .............. | 407/40 |
| 6,164,878 A * | 12/2000 | Satran et al. | ................ | 407/113 |
| 6,200,072 B1 * | 3/2001 | Andersson | ................ | 407/34 |
| 6,325,575 B1 * | 12/2001 | Pawlik | ................ | 408/83.5 |
| 6,379,087 B1 * | 4/2002 | Alexander, IV | ............ | 407/107 |
| 6,409,435 B1 * | 6/2002 | Kocherovsky et al. | ...... | 407/104 |
| 6,652,200 B2 * | 11/2003 | Kraemer | ................ | 407/11 |
| 6,733,214 B2 * | 5/2004 | Scherbarth | ................ | 407/113 |
| 2002/0106250 A1 * | 8/2002 | Murakawa et al. | ............ | 407/11 |
| 2003/0053872 A1 * | 3/2003 | Schlagenhauf | .............. | 408/184 |
| 2003/0081165 A1 * | 5/2003 | Chu et al. | ................ | 349/149 |
| 2003/0156910 A1 * | 8/2003 | Friedman et al. | ............ | 407/117 |
| 2004/0131433 A1 * | 7/2004 | Edler | ................ | 407/67 |
| 2005/0019113 A1 * | 1/2005 | Wermeister | ................ | 407/113 |

FOREIGN PATENT DOCUMENTS

| | | |
|---|---|---|
| DE | 89 10 333.5 | 10/1989 |
| GB | 1 369 096 | 10/1974 |
| JP | 48-53678 U | 7/1973 |
| JP | 63-151203 U | 10/1988 |
| JP | 05-092308 | 4/1993 |
| JP | 07-237008 | 9/1995 |
| JP | 09-155604 | 6/1997 |
| WO | WO 01/12369 | 2/2001 |

* cited by examiner

TOOL FOR THE METAL CUTTING MACHINING OF VALVE SEATS

BACKGROUND OF THE INVENTION

The invention relates to a tool for the metal-cutting machining of a surface, such as a valve seat in a cylinder head of an internal combustion engine and particularly to the configuration and attachment of the cutting tip thereof and relates to a method for the metal-cutting machining of such surface, such as a valve seat in a cylinder head of an internal combustion engines.

Tools and methods of the type under discussion here are known. The tools have a cutter tip which comprises at least one geometrically defined cutting edge. With the aid of that edge, chips can be removed from the valve seat either by the tool being rotated with respect to a fixed workpiece or the workpiece being rotated with respect to a fixed tool. As a rule, the former of the two procedures is performed. The valve seat has a first annular surface which encloses, with reference to an imaginary central axis of the annular surface, a first angle of inclination of, for example, approximately 45°. The first annular surface essentially determines the gas tightness of the valve. The first surface is adjoined first by a second annular surface with an angle of inclination of approximately 15° and secondly by a third annular surface with an angle of inclination of approximately 75°. During the machining of the valve seat, the tool is displaced axially along the common central axis of the annular surfaces until the cutter tip is in engagement with the valve seat and, for example, the first annular surface is machined. The machining therefore takes place by movement of the tool in the direction of the valve axis, which coincides with the central axis of the annular surface. The machining is referred to as a valve-cutting process. Preferably, the tools selected can be used to machine surfaces like both the valve seat and the valve guide, i.e. they have a cutter tip for machining the valve seat and a reamer for machining the valve guide. As a result, the central axis of the valve seat is aligned very precisely with the central axis of the valve guide, which contributes to the valve being well sealed.

The valve seat in cylinder heads of internal combustion engines is generally realized by valve seat rings which consist of very hard, wear-resistant sintered materials, which means that the machining is very complex and cubical boron nitride (CBN) generally has to be used, which is very expensive. In addition, very exacting requirements are made of the quality in order to ensure the "gas tightness". Even a small amount of wear to the cutting edge leads to the permissible tolerances being exceeded. Overall, it turns out that the costs for machining the valve seat are very high.

SUMMARY OF THE INVENTION

It is therefore the object of the invention to provide a tool of the type mentioned at the beginning which does not have this disadvantage.

To achieve this object, a tool is proposed which has a novel cutter tip and manner of its attachment. It is distinguished by the cutter tip resting on two supporting regions of the tool head which are arranged at an angle α and the angle-bisecting line of the angle α runs essentially perpendicularly with respect to the cutting edge which removes chips from the valve seat. The arrangement of the supporting surfaces gives rise to an inverted V guide for the cutter tip. As a result, the cutter tip is held in a very stable manner in the main body of the tool. The cutter tip is anchored on the tool in such a manner that the cutter tip hardly vibrates at all during the machining of a valve seat. It has been found that vibrations cause a relatively pronounced increase in the wear of the cutting edge and that, conversely, if the cutter tip is anchored in a manner such that it hardly vibrates, the wear of the active cutting edge, i.e. the cutting edge which removes chips from the valve seat, can be significantly reduced.

It is also the object of the invention to provide a method which does not have the disadvantages mentioned.

To achieve this object, the method of the invention is distinguished by the cutter tip of the tool not needing to be reset or adjusted if a cutting edge becomes worn. This results in a substantial simplification of the method and therefore also to less expensive solutions.

BRIEF DESCRIPTION OF THE DRAWING(S)

Other objects and features of the invention are explained below with reference to the drawings, in which.

DESCRIPTION OF PREFERRED EMBODIMENTS OF THE INVENTION

Figure 1:
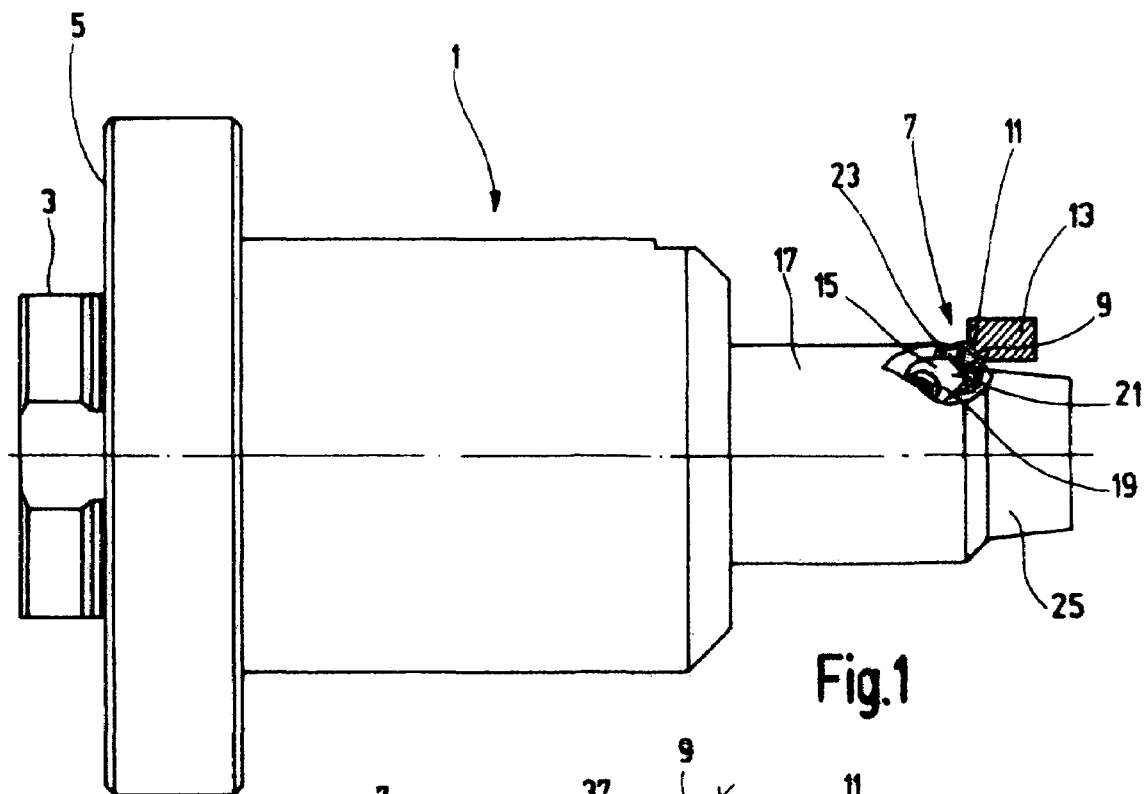
FIG. 1 shows a side view of a tool.

FIG. 1 shows a valve seat machining tool, i.e. a tool 1 which is used for machining valve seats in cylinder heads of internal combustion engines. On the left-hand side of the tool, there is a fastening stem 3 which is surrounded by an annular plane surface 5. The fastening stem 3 is used for coupling the tool 1 to a machine tool. The plane surface 5 ensures that the tool 1 is exactly aligned. The tool 1 may also be coupled to a machine tool in a different manner.

On the side of the tool 1 which lies opposite the fastening stem 3, there is a cutter tip 7 which has a geometrically defined cutting edge 9. The edge is used to remove chips from a valve seat 11 which is part of a valve seat ring 13 which is inserted into a cylinder head (not illustrated here) of an internal combustion engine.

The cutter tip 7 is fastened to the main body 17 of the tool 1 by a clamping claw 15. The clamping claw 15 is tightened with a clamping screw 19 in such a manner that a clamping lip 21 comes to rest on the front side 23 of the cutter tip 7, which side is also referred to as the cutter breast plate.

At that end 25 of the tool 1 which lies opposite the fastening stem 3, a point of separation can be provided at which a tool for machining the valve guide, in particular a reamer, can be fitted.

Figure 2:
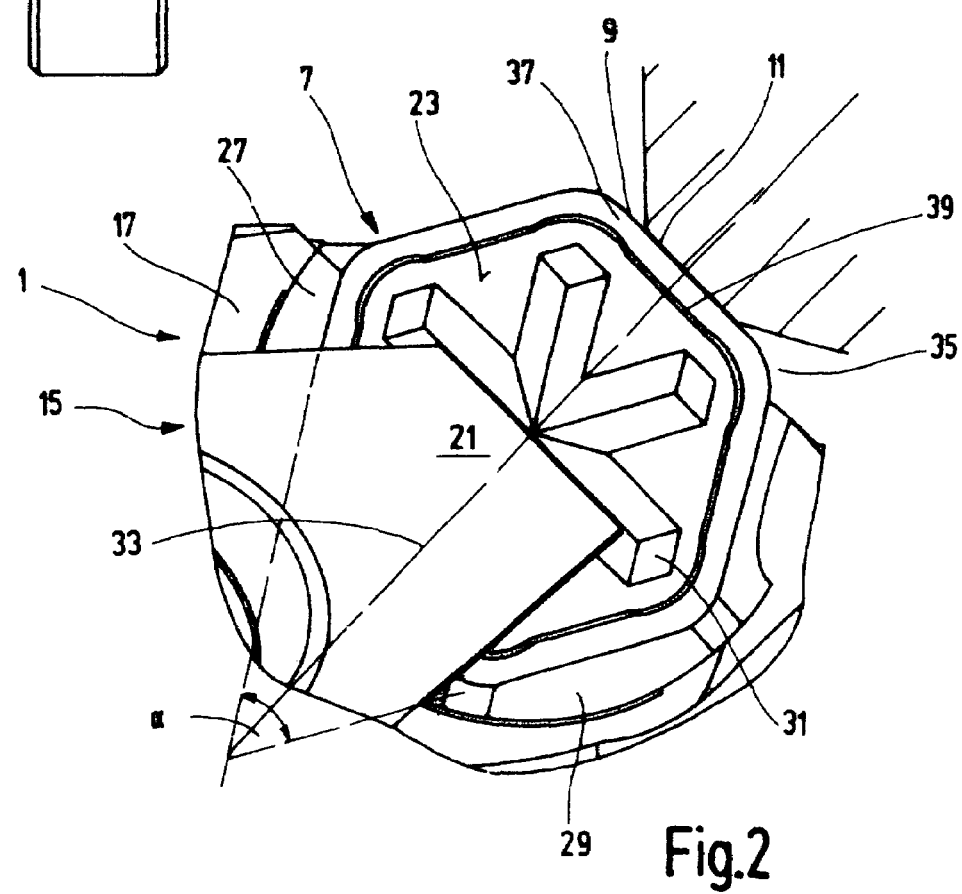
FIG. 2 shows an enlarged illustration in plan view of the cutter tip which is used in the tool according to FIG. 1.

The region in which the cutter tip 7 is fitted to the main body 17 of the tool 1 is illustrated on an enlarged scale in FIG. 2.

Identical parts are provided with the same reference numbers, so that reference can be made to the description for FIG.

1. The enlarged FIG. 2 shows the cutter tip 7 in plan view. It has a first supporting region 27 and a second supporting region 29 on which the cutter tip 7 not only rests, but is also pressed against the supporting regions 27 and 29 by the clamping claw 15.

In order to improve the holding forces of the clamping lip 21 of the clamping claw 15, clamping notches 31 which are of V-shaped design—as seen in cross section—are made in the front side 23 of the cutter tip 7, so that the clamping lip 21 not only presses the cutter tip 7 against the supporting regions 27 and 29, but also against a supporting surface (not visible here).

The supporting regions 27 and 29 are arranged at an angle α, specifically in such a manner that the angle-bisecting line 33 is essentially perpendicular to the active cutting edge 9 with which chips are removed from the valve seat 11.

In the exemplary embodiment illustrated here, the cutter tip 7 is designed as an indexable tip. It can be rotated about an imaginary axis which is perpendicular to the front side 23 of the cutter tip 7. As a result, if an active cutting edge 9 becomes worn, a further cutting edge 9 of the cutter tip 7 is available for machining the valve seat 11. The cutter tip 7 is shown here as a hexagon, with six cutting edges 9 each separated from adjacent cutting edges 9 by a rounded corner 35. The cutting edges 9 is formed in each case by the outer edge region of the cutter tip 7 which lies between two adjacent corners 35.

The cutter tip 7 of the tool 1 should be ground in a very precise manner to have absolutely straight cutting edges 9.

In this exemplary embodiment, it is possible to turn the cutter plate 7 six times and thus to make six cutting edges 9 available for machining a valve seat. Accordingly, three clamping notches 31 are arranged in a star-shaped manner on the front side 23 of the cutter tip 7. Each cutting edge is adjoined by a chip-guiding surface 37 which is bounded by chip-guiding steps 39 which are arranged at a distance from the cutting edge. The chips removed by the cutting edge 9 strike against the edges 39 and become broken. The general design of a cutter tip 7 as illustrated in FIGS. 1 and 2 is known in principle. However, a difference here is that it is not actually the corners 35 which are used as cutting edges in the metal-cutting machining of a workpiece, but rather the regions between the corners. Accordingly, FIG. 2 also illustrates the cutting edge 9 machining the valve seat 11 with a region lying between the corners 35. In this case, the active cutting edge 9 is not as long as the outer edge of the cutter tip 7, which edge lies between the corners 35.

Figure 3:
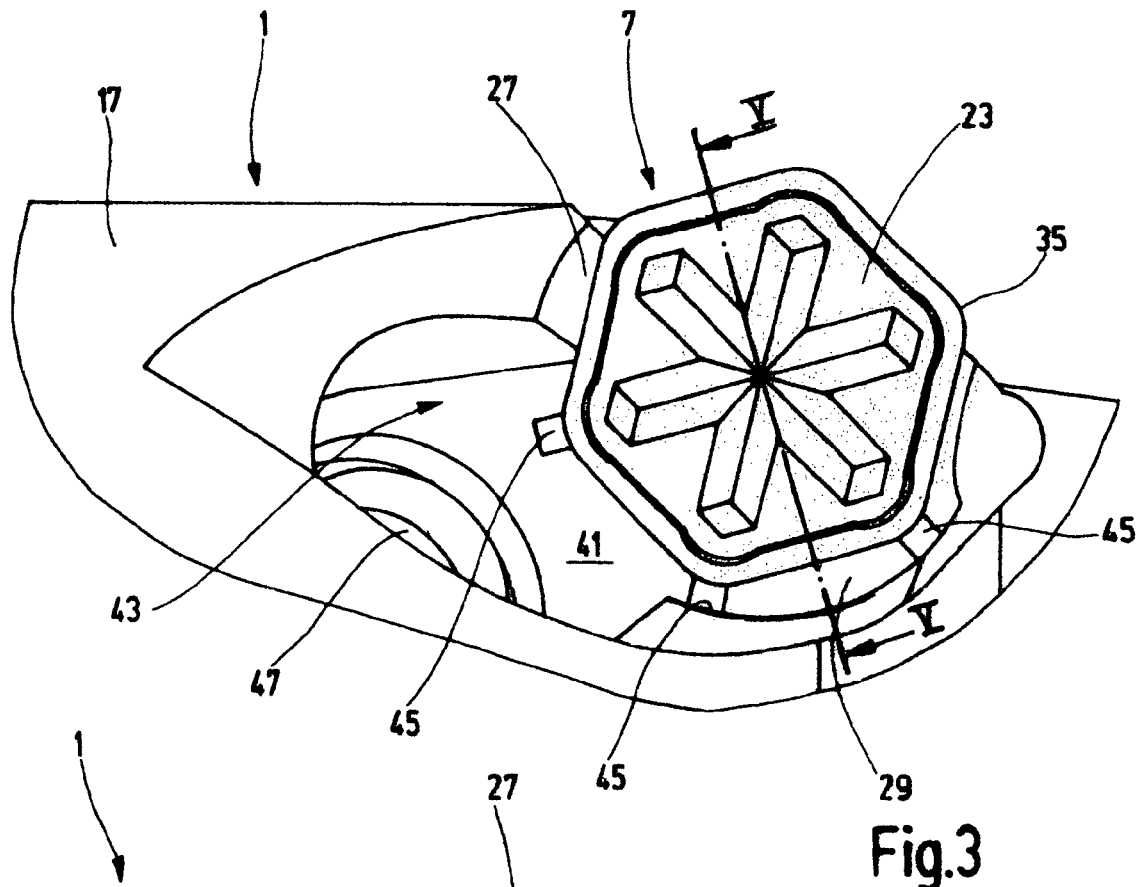
FIG. 3 shows a plan view of the cutter tip with the clamping claw removed.

FIG. 3 shows the cutter tip 7 in the installed position, which is also the position illustrated in FIGS. 1 and 2, but with the clamping claw removed. Identical parts are provided with the same reference numbers, so that reference is made to this extent to the preceding description.

FIG. 3 shows that the cutter tip 7 is inserted into the main body 17 of the tool 1 such that it rests with at least two sides on respective supporting regions 27 and 29. Clearances 45, which are in the region of the corners 35 of the cutter tip 7, are provided in the region of the main surface 41 of a recess 43, which holds the cutter plate 7 and the clamping claw 15. This ensures that the rear side lying opposite the front side 23 of the cutter tip 7 rests flat on the main surface 41. FIG. 3 shows a hole 47 which pierces the main surface 41 of the main body 17. The clamping screw 19 (FIG. 1) anchors the clamping claw 15 to the main body 17 and engages in the hole 47.

Figure 4:
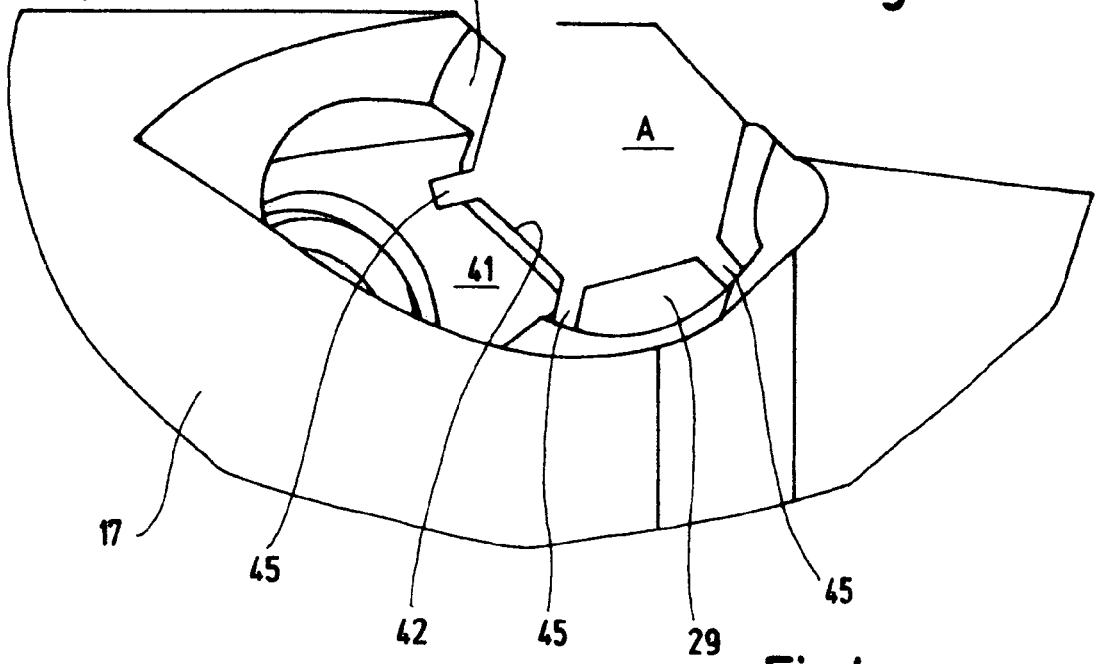
FIG. 4 shows a plan view of a subregion of a tool without the cutter tip.

For clarification purposes, FIG. 4 shows the same detail of the tool 1 as in FIG. 3, without the cutter tip 7, revealing the bearing surfaces 27 and 29 and the main surface 41.

FIG. 4 shows that the main surface 41 may also have a step 42, causing the region in which the clamping claw 15 comes to lie somewhat higher than the direct supporting region A for the cutter tip 7.

Figure 5:
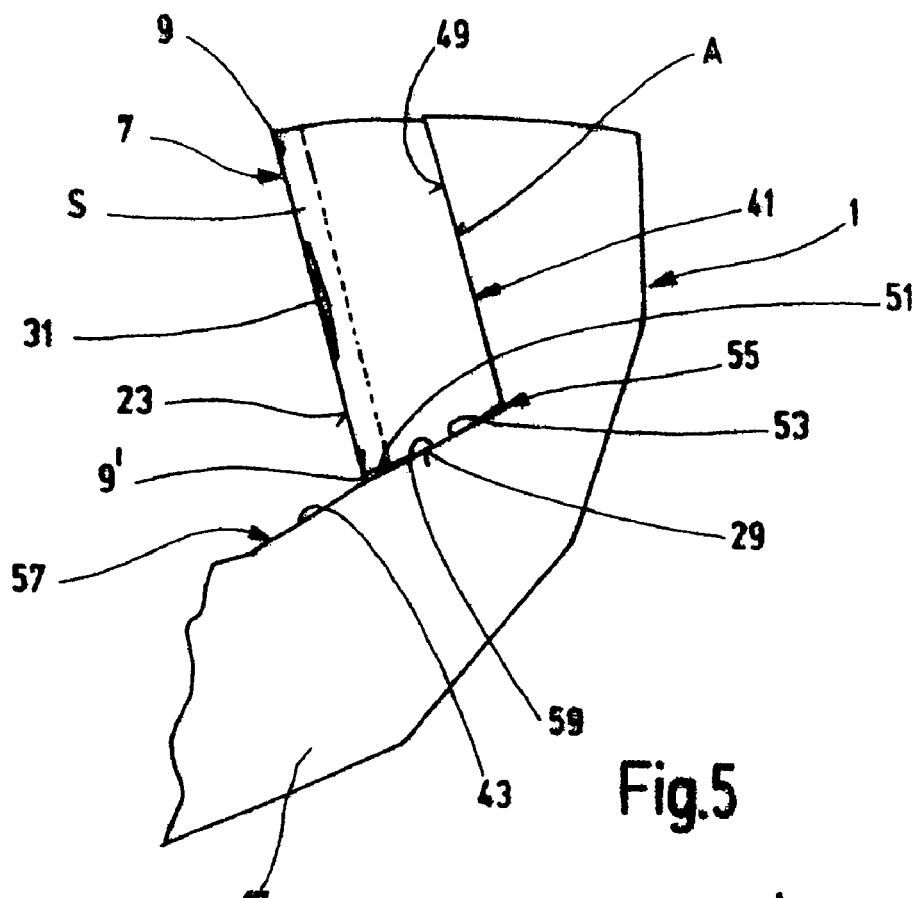
FIG. 5 shows a cross section through the tool along the line V-V indicated in FIG. 3.

FIG. 5 shows a cross section along the line V-V shown in FIG. 3. The cutter tip 7 is arranged on the main surface 41, and specifically in the supporting region A of the recess 43 of the main body 17 of the tool 1. The clamping notches 31 are in the front side 23 of the cutter tip 7, in which the clamping lip 21 (not illustrated here) of the clamping claw 15 can be seen.

The sectional illustration also shows the second supporting region 29 on which the cutter plate 7 rests. The plate is of virtually trapezoidal cross section. The larger main surface of the trapezium is formed by the front side 23 of the cutter tip 7. The upper side is formed by the rear side 49 of the cutter tip 7, which side lies opposite the front side 23. The rear side 49 is placed on the main surface 41. The side surfaces of the trapezium of the cutter tip 7 are formed by its flanks.

FIG. 5 shows a cutting edged 9 at the top and, lying opposite it, a cutting edge 9'. The cutting edge 9' is adjoined by a first flank region 51 which has a selected angle of inclination<90.degree. with respect to the front side 23. The first flank region 51 merges into a second flank region 53 which runs exactly parallel to the supporting regions, i.e. here parallel to the second supporting region 29.

The angle of inclination of the first flank region 51 may be greater than that of the second flank region 53, so that the first flank region 51 does not rest on the supporting region 29 so that the cutting edges, here 9', resting on the supporting region cannot be damaged.

To ensure a defined contact of the cutter tip 7 against the supporting region 29, in the vicinity of the main surface 41, a "clearance" 55 is provided, i.e. a gap between the side surface 57 of the recess 43 and the side surface 59 of the cutter plate 7. The clearance can be realized by the side surface 57 of the recess 43 running away from the cutter tip 7 in the direction of the main surface 41 or by the cutter tip 7 being somewhat abraded in the region of the clearance 55.

The side surface 59 of the cutter tip 7 should rest on the main body 17 of the tool 1 in the supporting region 29.

In the exemplary embodiment illustrated in FIG. 5, the second supporting region 29 is formed directly by the main body 17 of the tool 1.

Figure 6:
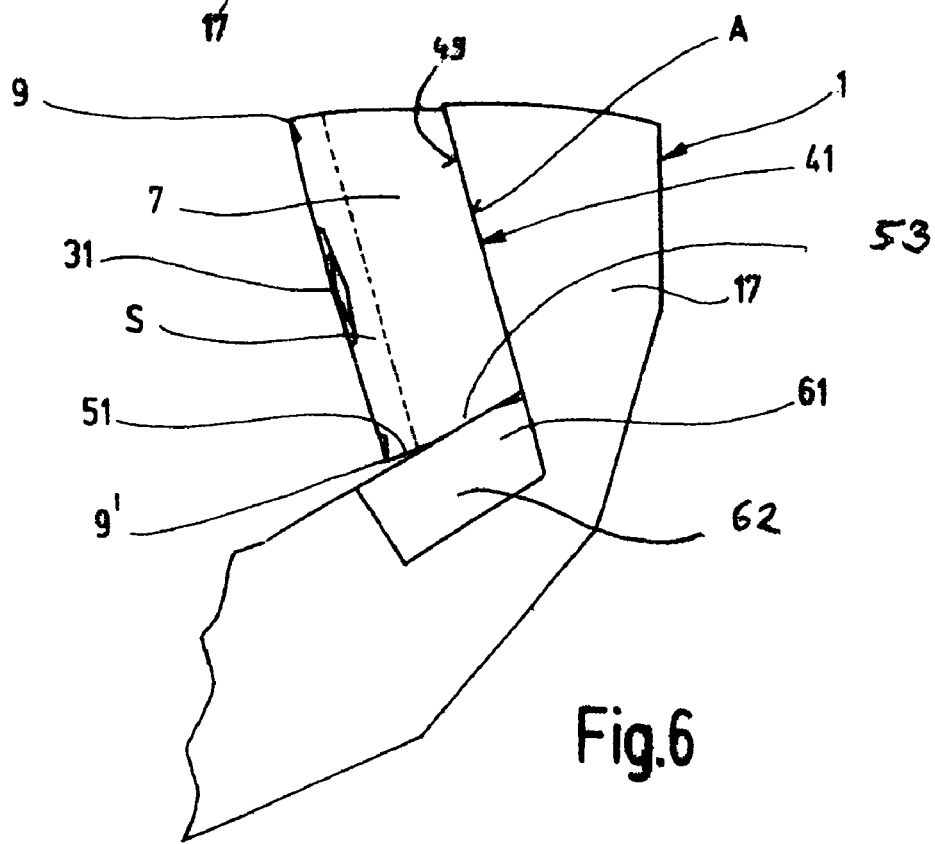
FIG. 6 shows a detail of a tool with a coolant/lubricant feed.
Figure 6A:
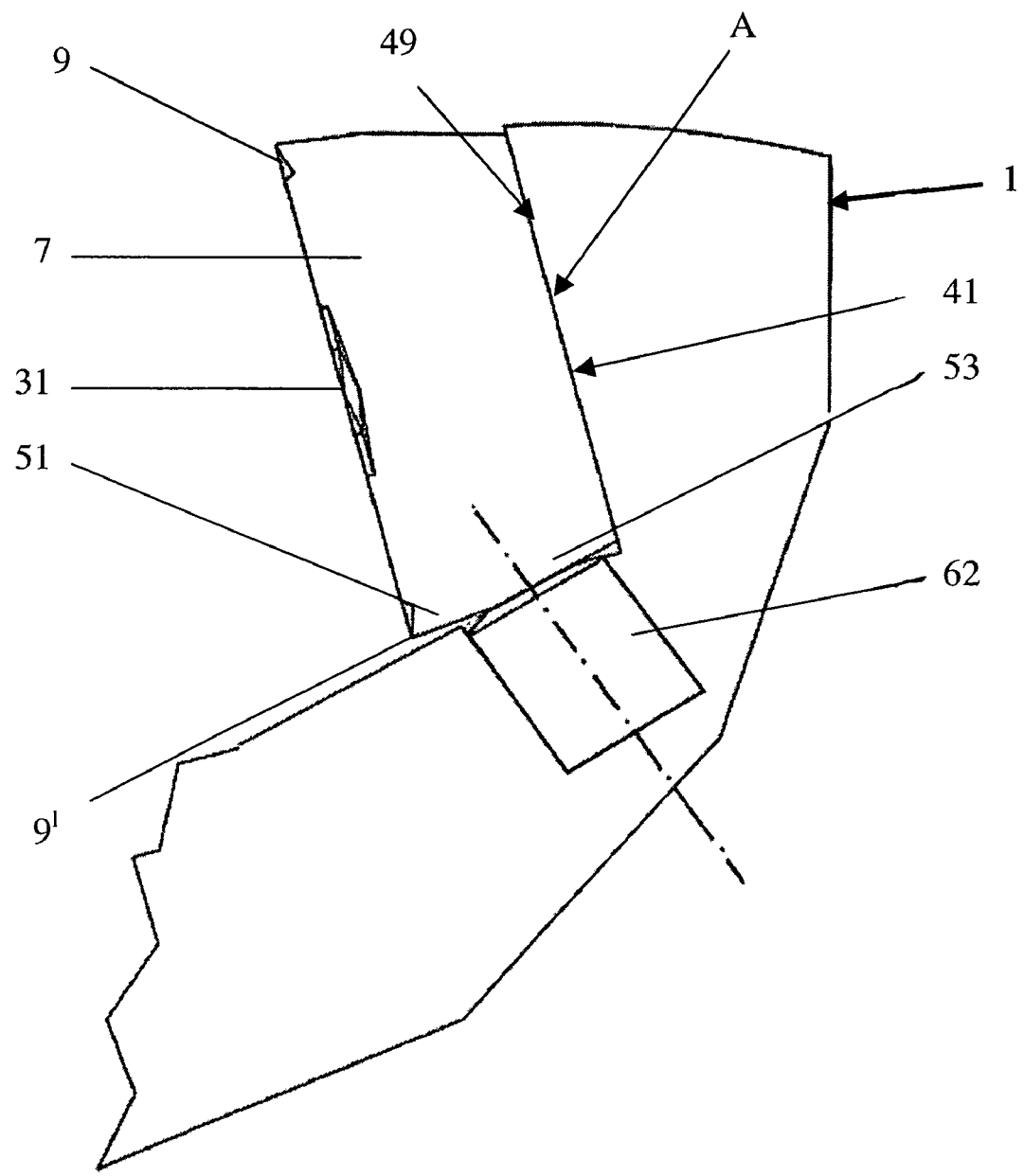
FIG. 6A shows a detail of a tool with a coolant/lubricant feed in accordance with another embodiment of the present application.

FIG. 6 shows a modified exemplary embodiment of a tool 1, specifically again in section along the line V-V which is illustrated in FIG. 3. Identical parts are provided with the same reference numbers, so that reference is made to the description for the preceding Figures. The sole difference over the tool 1 which is illustrated in FIG. 5 is that inserts 61 which form the supporting regions 27 and 29 are placed into the main body 17, or are at least provided here. In this case, it is possible to provide inserts which are of more or less rectangular design or else to insert a pin 62 into the main body 17, such as illustrated in FIG. 6A, said pin 62 being provided in each case in the region of the supporting regions and being used to support the cutter tip 7.

The material of the inserts is preferably harder than that of the main body 17. Inserts 61 made of metal carbide and/or ceramic and/or CBN are particularly preferred.

In FIGS. 5 and 6, a dashed line indicates the fact that the cutter tip 7 is provided with a layer S of cubical boron nitride (CBN), having a thickness which is preferably selected such that this layer does not come into contact with the supporting regions 27 and 29. The main body of the cutter tip 7 preferably is comprised of metal carbide.

FIG. 7 once again shows the cutter tip 7, which is secured by a clamping claw 15, with a modified embodiment of the clamping lip 21.

Tools of the type discussed here are usually provided with a coolant/lubricant supply, by which the active cutter 9, i.e. the cutter which is in the process of removing chips from a valve seat 11, is charged with the coolant/lubricant to prevent the cutter becoming too hot, and particularly to keep the temperature of the cutting edge as uniform as possible.

Figure 7:
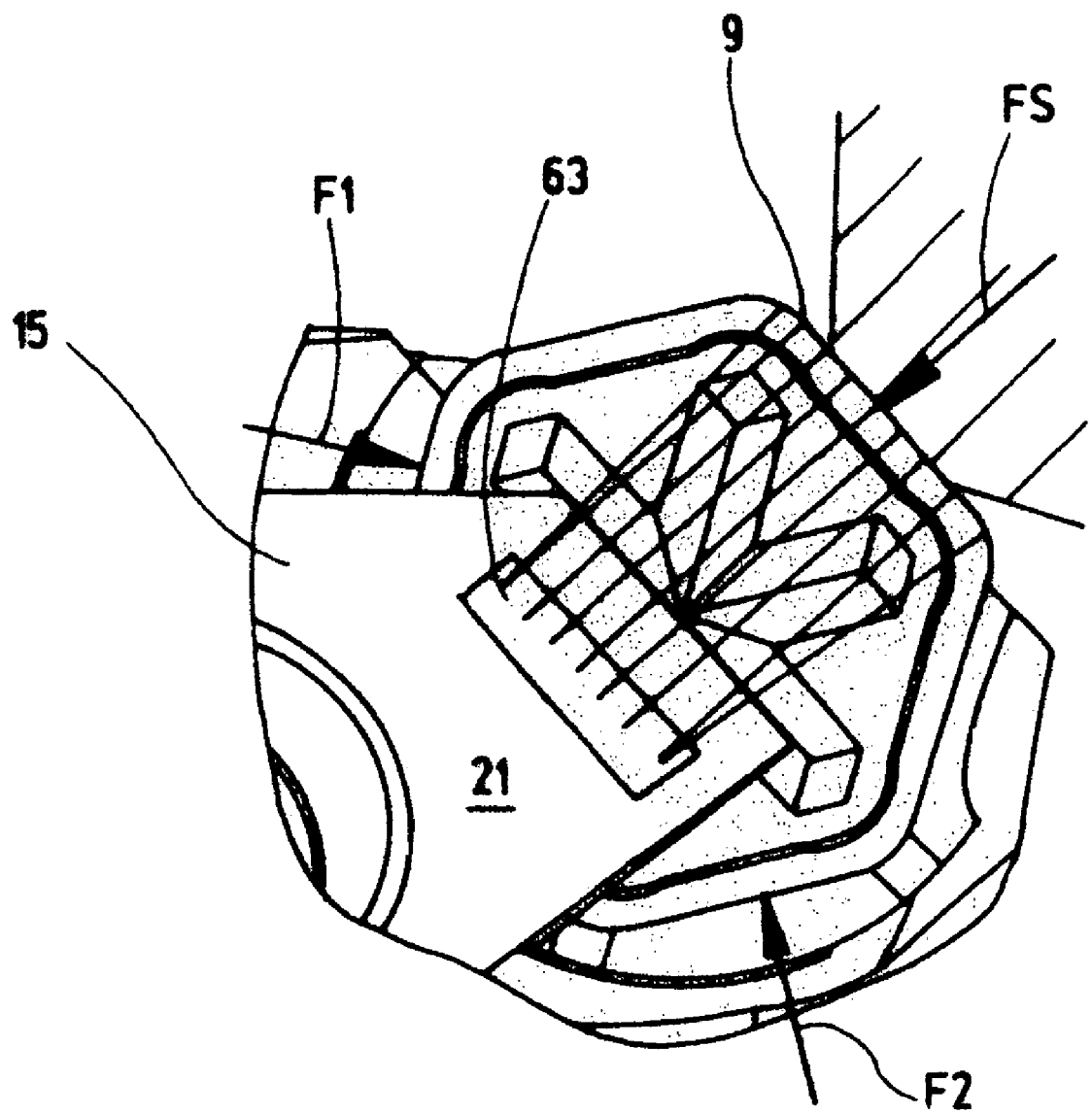
FIG. 7 shows a section according to FIG. 5 through a modified tool.

In the embodiment in FIG. 7, the clamping claw 15, and more precisely its clamping lip 21, has a coolant outlet 63 from which the coolant emerges in the direction of the active cutter 9. The coolant outlet 63 is elongate here, and particular rectangular, and preferably runs parallel to the active cutter 9. The length of the coolant outlet 63 is selected so that the active cutter 9 is charged with the coolant/lubricant over its entire width.

FIG. 7 details the forces which occur during the machining of a valve seat. The cutting force FS is indicated by a first arrow and the two supporting forces which are applied by the supporting regions 27 and 29 are indicated by arrows by F1 and F2.

Figure 8:
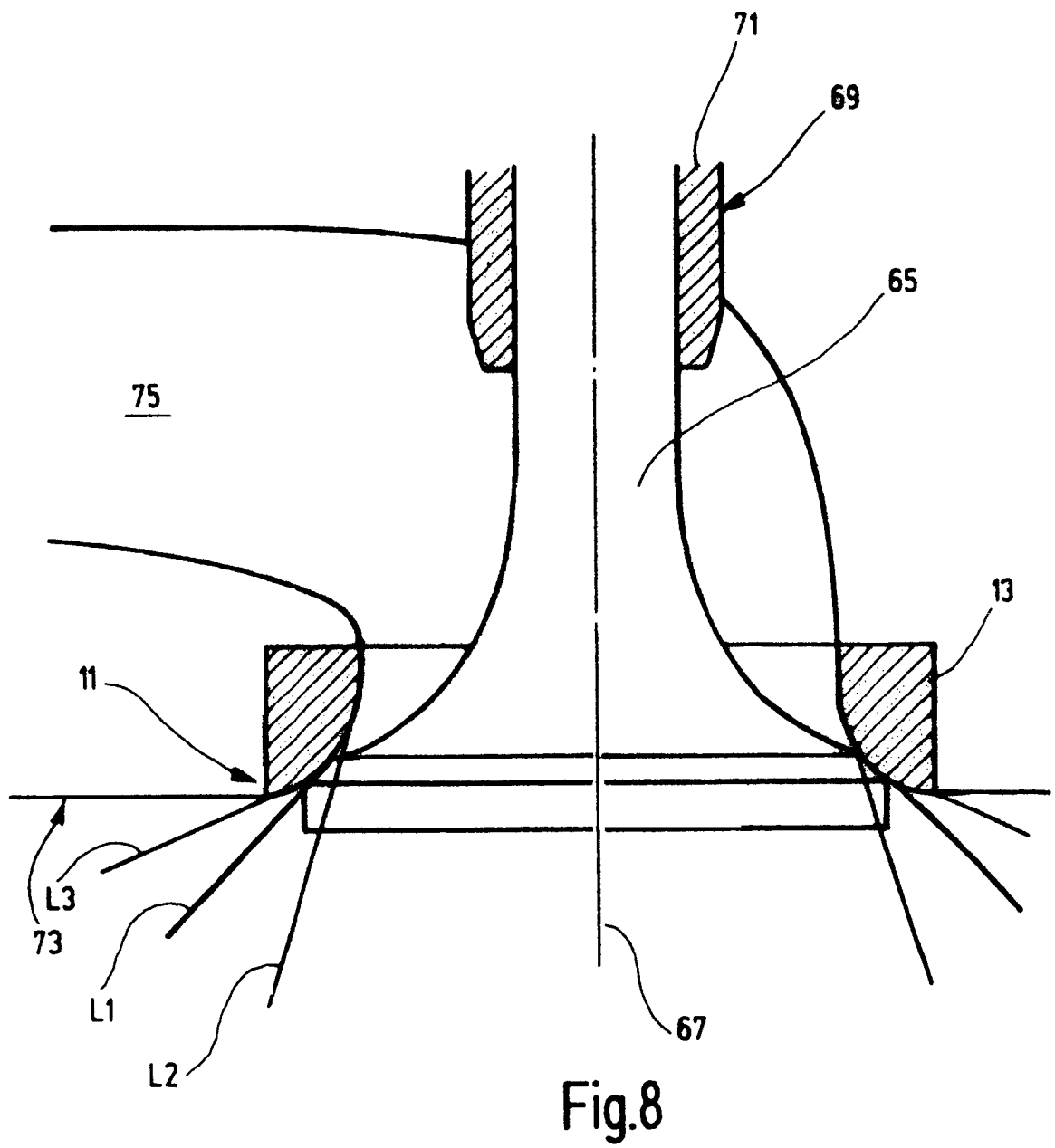
FIG. 8 shows a schematic diagram of a valve seat with a valve.

FIG. 8 is a schematic diagram of a valve seat 11 with a valve 65. The valve seat is realized in the region of the valve seat ring 13. The inside of the ring 13 has three annular regions, which run concentrically with respect to an imaginary central axis 67 which also constitutes the central axis of a valve guide 69. The valve guide may comprise a cylindrical insert 71 comprised of a hardened, wear-resistant material, and, like the valve seat ring, the ring is inserted into the cylinder head of an internal combustion engine. In the region of the valve seat, the valve closes an inlet or outlet 75 of the internal combustion engine which comprises the cylinder head 73.

Three annular regions of the valve seat are indicated by three lines indicated on the right and left of the central axis 67. A first annular region encloses with the central axis 67 an angle of, for example, approximately 45°, which is indicated by a first line L1. Situated above the first annular region is a second annular region indicated by a second line L2, which has a wall which tapers conically from the bottom upward and encloses with the central axis 67 an angle of approximately 75°. Situated below the first annular region is a third annular region, indicated by a third line L3, which tapers conically from the bottom upward and the wall of which encloses with the central axis 67 an angle of 15°.

For valve seats of the type described here, the gas tightness of the combustion chamber, which is situated below the valve 65, is of particular concern. This has a particularly pronounced effect on the consumption and power of the internal combustion engine.

As indicated in FIG. 8, the valve seat 11 is preferably formed by a valve seat ring 13 which is pressed or shrunk into the cylinder head 73. It is comprised of a very hard, wear-resistant material.

The valve seat ring, which is illustrated in cut-away form in FIG. 8, has three encircling annular surfaces here at different angles with respect to the central axis 67. The first annular surface, which runs at angle of 45° with respect to the central axis 67, is intended essentially for the gas tightness, although the corresponding contour of the valve in the lower region which interacts with the valve seat, i.e. the contour of the valve disk, is likewise important.

The requirements placed on the quality of the sealing surface of the valve seat 11, i.e. here placed essentially on the first annular surface, are very exacting in respect of surface quality and evenness. In addition, the angle with respect to the central axis 67, which angle is indicated by the line L1, has to be formed within very exacting tolerances. This requires that the cutter 9 of the cutter tip 7 be ground very precisely and have absolutely straight cutting edges. In addition, the cutter tip must be held in a very exact and stable tip seat in order to ensure that the cutter tip, and therefore the active cutter, are exactly aligned with respect to the valve seat. These requirements are of crucial importance, particularly if very hard materials have to be machined and, for example, polycrystalline cubical boron nitride is used as the material for the cutter. Particularly in the case of this brittle material, no vibrations must occur at all, since otherwise the service lives of the cutters are poor.

During the machining of the valve seat, i.e. during the process of cutting the valve seat, the tool (not illustrated in FIG. 8) is moved along the central axis 67 until the cutter tip comes into engagement with the valve seat 11 and the valve seat ring 13. In order to produce the annular regions having different angles of inclination, tools with cutters inclined at different angles are used. Of course, during the machining of the valve seat, the valve 65 is removed, so that the tool can be introduced into the interior of the valve seat ring 13.

As stated above, a reamer can be inserted into the end 25 of a tool according to FIG. 1 to machine the inner surface of the valve guide 69 and guide the tool. If the tool is displaced along the central axis 67 to machine the valve guide 69, the cutter tip 7 eventually comes into engagement with the valve seat 11, so that one of the annular surfaces is machined here. If the valve seat and the valve guide are machined with a tool, the central axis of the valve seat ring and the central axis of the valve guide can be aligned extremely precisely, which contributes to the valve being very well sealed.

The following describes the operation of the tool:

The tool 1 is set into rotation for machining a valve seat 11, which, as a rule, is part of a valve seat ring 13. The tool is introduced into the opening in the valve seat, i.e. is displaced axially in the direction of the central axis of the annular valve seat, until the cutter tip 7 removes chips from the valve seat 11. The machining process is also referred to as the process of cutting the valve seat. The valve seats or valve seat rings which are to be machined are of very hard sintered materials, requiring correspondingly hard cutter tips 7 be used, preferably cutter tips which include a layer S of cubical boron nitride (CBN). This material has the property of being very sensitive to vibrations. If vibrations occur during machining of a valve seat 11, this causes a very pronounced degree of wear, which leads to interruptions in the machining process because the cutter tip has to be exchanged, or, as in the tools described here, the tool has at least to be rotated in order to bring a new cutter of the cutter tip, which is designed as an indexable tip, into engagement with the valve seat.

In the tools 1 described here, the cutter tip 7 can be anchored very securely in the main body 17 of the tool 1 because it is supported on two supporting regions 27 and 29 which are arranged at an angle α with respect to each other, and specifically such that the angle-bisecting line 33 is virtually perpendicular to the valve seat 11 which is to be machined and to the active cutter 9.

The cutter tip 7 is pushed onto the supporting regions 27 and 29 firstly by the clamping claw 15 and secondly by the cutting forces FS, which are illustrated in FIG. 7. The supporting regions 27 and 29, which are arranged at an angle α, supply the supporting forces F1 and F2, effectively providing an inverted V guide for the cutter tip 7.

The forces pressing the cutter tip 7 against the supporting regions 27 and 29 have to be very high, particularly if the supporting regions are provided with inserts 61 of a material which is harder than that of the main body 17 of the tool 1.

Inserts 61 of metal carbide and/or ceramic and/or CBN are preferably used, so that very high press-on forces can be realized without causing any deformations in the supporting regions 27 and 29, which would cause the cutter tip 7 to be misaligned. The inverted V guide thus enables the cutter tip to be held and secured very exactly at a predeterminable angle in the main body 17 of the tool 1.

It is clear that in the tool 1, because the cutter tip 7 is designed as an indexable tip and because of the exact positioning of the cutter tip 7 by the supporting surfaces 27 and 29, resetting or adjusting devices, which might weaken the tool 1, are not required. Space is gained which may also allow the use of larger clamping screws in conjunction with the clamping claw 15, so that the clamping forces may also be increased.

Since the cutter tip 7 need merely be rotated if the active cutter 9 becomes worn, it is not disadvantageous for the tool 1 to omit an adjusting device for resetting the cutter tip 7 if it becomes worn. The inverted V guide of the cutter tip is designed, as FIG. 7 shows, such that the cutter tip is stabilized by the cutting forces FS in the main body 17 of the tool 1, namely is pressed against the supporting regions 27 and 29.

If the supporting regions 27 and 29 are provided with inserts 61, the inserts may be of essentially rectangular design, as can be seen in FIG. 6. However, it is also possible for a pin, against which the cutter plate 7 is supported, to be inserted in each case into the main body 17 of the tool 1. However, a sheet-like design is preferred to support higher press-on forces without any problem.

FIGS. 5 and 6 show that a layer of the cutter tip 7 is comprised of CBN and is preferably shaped in such that the layer merely extends over a first flank region 51. This avoids the very brittle material being acted upon by lateral forces, which could possibly cause damage. Since the main body of the cutter tip 7 is preferably of metal carbide, very high supporting forces can be built up in the supporting regions 27 and 29 without causing any disadvantageous deformation of the cutter tip 7.

The above explanations of the Figures show clearances provided at critical points to avoid point-like or line-like loads. Clearances 45 are provided first in the region of the corners 35 of the cutter tip 7 and secondly in the transition region between the side surface 59 of the cutter tip 7 and its rear side 49. This last-mentioned clearance 55 may, as explained above, be realized in a different manner, namely by an offset of the side surface 59 of the cutter tip 7 or of the side surface 57 of the recess 43 in which the cutter tip 7 is accommodated.

It has also been found that a targeted coolant/lubricant feed is advantageous in particular for cutter plates with a layer S of CBN. The cutting material CBN is sensitive to thermal shock and sensitive to different temperatures of the cutting edge 9. The special coolant/lubricant feed through the clamping claw 15 achieves very effective cooling of the active cutter 9, which removes chips from the valve seat 11, particularly if a coolant outlet 63 is provided in the clamping claw 15 and if that outlet is elongate and designed such that the active cutter 9 is charged with coolant in the region of the machined valve seat 11. It is therefore possible to match the jet of coolant to the width of the cutter and to ensure uniform cooling by the coolant outlet 63 running parallel to the active cutter 9.

The explanations regarding the tool make it clear that, in a method for machining valve seats in cylinder heads of internal combustion engines with a tool which comprises at least one cutter tip having a geometrically defined cutter, the method is simplified by the fact that should the active cutter become worn, an adjustment of the tool can be omitted. It turns out that the cutter tip is aligned in such an exact manner by the supporting regions that desired dimensions of the valve seat are given when the cutter tip is exchanged. These dimensions are also obtained because a cutter tip has a plurality of cutting edges and is turned, i.e. rotated, if a cutter becomes worn, so that a new cutter comes into engagement with the valve seat to be machined.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A tool for metal cutting machining a surface in an opening, the tool comprising:
    a cutter tip having at least one geometrically defined cutting edge, the cuffing edge formed in a straight line between two adjacent corners of the cutter tip, wherein the cutter tip is a hexagonally shaped indexable tip and wherein an angle between each side of the cutter tip and an adjacent side is substantially the same for each side of the cutter tip;
    the cutter tip having a front side with at least one clamping notch having a V-shaped cross-section formed in the front side;
    two supporting regions in the tool for supporting the cutter tip, the supporting regions having support surfaces against which the cutter tip rests, and the support surfaces of the supporting region are oriented with respect to each other at an angle, the supporting regions also being so oriented that a line bisecting the angle between the support surfaces runs essentially perpendicular to an active one of the cutting edges, which is the edge that removes metal chips from the surface in the opening, wherein the cutter tip is turnable six times to make six cutting edges available for machining;
    a clamping claw which holds the cutter tip to the supporting regions, the clamping claw comprising a clamping lip; wherein
    the clamping lip comes to rest on a front side of the cutter tip and engages the clamping notch, and wherein the tool and cutter tip thereof are both shaped to be operable for metal cutting machining of valve seats in cylinder heads of internal combustion engines.

2. The tool of claim 1, wherein the tool includes a main body and the supporting regions are formed in the main body.

3. The tool of claim 1, wherein the tool has a main body and inserts in the main body are positioned for defining the respective supporting regions.

4. The tool of claim 3, wherein the inserts are essentially rectangular cross section shaped elements.

5. The tool of claim 3, wherein the inserts are pin-shaped elements.

6. The tool of claim 3, wherein the main body is comprised of a material of a first hardness and the inserts are comprised of a material of a greater hardness than the hardness of the main body.

7. The tool of claim 6, wherein the inserts are of a material selected from at least one of the group consisting of metal carbide, ceramic and cubical boron nitride.

8. The tool of claim 1, wherein the main body is shaped to define clearances around the cutting tip at least in regions of the tool at the supporting regions for the cutting tip.

9. The tool of claim 1, further comprising a feed for at least one of coolant and lubricant located in the tool for feeding at least one of coolant and lubricant to the cutting edge.

10. The tool of claim 9, wherein the clamping claw which holds the cutting tip to the supporting regions includes the feed for at least one of coolant and lubricant.

11. The tool of claim 10, wherein the feed for at least one of coolant and lubricant includes an elongate coolant outlet in the claw, the outlet runs essentially parallel to the then active cutter edge.

12. The tool of claim 1, wherein the cutter tip is tipped with cubical boron nitride.

13. The tool of claim 1, wherein the cutter tip has an external layer of cubical boron nitride for cutting purposes.

14. The tool of claim 1, wherein the cutter tip has a flank which includes regions of different angles of inclination.

15. A method for metal cutting machining of a surface in an opening comprising:

operating a tool to metal cut machine a surface in an opening, the tool comprising:

a cutter tip having at least one geometrically defined cutting edge, the cutting edge formed as a straight line between two adjacent corners of the cutter tip, wherein the cutter tip is a hexagonally shaped indexable tip and wherein an angle between each side of the cutter tip and an adjacent side is substantially the same for each side of the cutter tip;

the cutter tip having a front side with at least one clamping notch having a V-shaped cross-section formed in the front side;

two supporting regions in the tool for supporting the cutter tip, the supporting regions having support surfaces against which the cutter tip rests, and the support surfaces of the supporting region are oriented with respect to each other at an angle, the supporting regions also being so oriented that a line bisecting the angle between the support surfaces runs essentially perpendicular to an active one of the cutting edges, which is the edge that removes metal chips from the surface in the opening, wherein the cutter tip is turnable six times to make six cutting edges available for machining;

a clamping claw which holds the cutter tip to the supporting regions, the clamping claw comprising a clamping lip; wherein the clamping lip comes to rest on a front side of the cutter tip and engages a clamping notch, and wherein the tool and cutter tip thereof are both shaped to be operable for metal cutting machining of valve seats in cylinder heads of internal combustion engines; and wherein the cutter tip is not required to be reset or adjusted when a respective active cutting edge thereof becomes worn.

16. The method of claim 15, further comprising displacing the tool in the direction of a central axis of the opening being machined during machining of the metal surrounding the opening.

17. The method of claim 15, wherein the cutter tip is an indexable tip.

18. A tool for metal cutting machining a surface in an opening, the tool comprising:

a cutter tip having at least one geometrically defined cutting edge, the cutting edge formed in a straight line between two adjacent corners of the cutter tip, wherein the cutter tip is a polygon shaped indexable tip and wherein an angle between each side of the cutter tip and an adjacent side is substantially the same for each side of the cutter tip;

the cutter tip having a front side with at least one clamping notch having a V-shaped cross-section formed in the front side;

two supporting regions in the tool for supporting the cutter tip, against which the cutter tip rests, and the supporting regions are oriented with respect to each other at an angle, the supporting regions also being so oriented that a line bisecting the angle between the supporting regions runs essentially perpendicular to an active one of the cutting edges, which is the edge that removes metal chips from the surface in the opening, wherein the cutter tip is turnable to make multiple cutting edges available for machining;

a clamping claw which holds the cutter tip to the supporting regions, the clamping claw comprising a clamping lip; wherein the clamping lip comes to rest on a front side of the cutter tip and engages the clamping notch, and wherein the tool and cutter tip thereof are both shaped to be operable for metal cutting machining of valve seats in cylinder heads of internal combustion engines.

19. The tool of claim 18, wherein the cutter tip is hexagonal in shape.

* * * * *